United States Patent [19]
Ueda et al.

[11] 3,742,824
[45] July 3, 1973

[54] AUTOMATIC EXPOSURE DEVICE FOR CAMERA

[75] Inventors: Hiroshi Ueda, Nara; Takeshi Egawa, Wakayama, both of Japan

[73] Assignee: Minolta Camera Kabushiki Kaisha, Osaka, Japan

[22] Filed: Mar. 10, 1972

[21] Appl. No.: 233,653

[52] U.S. Cl. .............. 95/11 R, 95/10 C, 95/64 R
[51] Int. Cl. ..... G01j 1/00, G03b 9/02, G03b 19/00
[58] Field of Search .............. 95/11 R, 64 R, 10 C, 95/31 FS

[56] References Cited
UNITED STATES PATENTS

| | | | |
|---|---|---|---|
| 3,461,783 | 8/1969 | Fujii | 95/64 R X |
| 3,537,366 | 11/1970 | Engelsmann et al. | 95/64 R X |
| 3,485,154 | 12/1969 | Yamada | 95/11 R X |

*Primary Examiner*—Robert P. Greiner
*Attorney*—Stanley Wolder

[57] ABSTRACT

An automatic exposure device comprising a striplike electric resistor and a brush in sliding contact therewith which are rotatable by film speed setting operation and diaphragm aperture adjusting operation to be shifted relative to each other so that the electric resistance determined by the change in the relative position of the resistor and brush serves as an element for determining automatic exposure. The device further includes a film speed dial, a positioning disc for setting the dial in a position corresponding to a film speed and an exposure adjusting member which rotates one of the brush or the electric resistor. By disengaging the film speed dial from the positioning disc, the exposure adjusting member is permitted to move the film speed dial in operative relation thereto, while when the positioning disc is in engagement with the film speed dial, the exposure adjusting member can be rotated intentionally.

6 Claims, 3 Drawing Figures

AUTOMATIC EXPOSURE DEVICE FOR CAMERA

BACKGROUND OF THE INVENTION

The present invention relates to an automatic exposure camera, more particularly to an automatic exposure device for camera wherein a striplike electric resistor and a brush in sliding contact therewith are shifted relative to each other by diaphragm aperture setting operation and film speed setting operation and the electric resistance determined by the change in the relative position is utilized as an element for determining the amount of automatic exposure, the exposure control device being so adapted as to intentionally effect an exposure in excess of or less than the normal exposure value automatically determined by the device.

The device of this type is designed for photography involving compensation for filter factor with a camera of the body side eye light measuring type or for intentionally over- or under-exposing several frames of film in succession with a cine camera or it is intended for use in a camera which is used relatively frequently. Accordingly, a camera incorporating such device is set for making an amount of exposure which is more or less than the normal exposure value, so that, every time a photograph is to be taken with a normal exposure value, the previous setting for intentional exposure adjustment has to be relieved. However, the photographer frequently forgets to relieve the setting and takes a faulty photograph because of an over- or under-exposure.

On the other hand, with an automalic exposure still camera incorporating the lens side eye or TTL light measuring system, the device of the foregoing type is used only for compensation for special photographing conditions such as compensation for backlight when there is a difference in the distribution of brightness between the area wherein the light is measured by the camera and the area to be photographed. Thus, in the case of a camera incorporating the conventional device for intentional exposure adjustment and adapted to remain set for an over- or under-exposure once the device is set for such operation and insofar as the setting is not relieved, frequent faults will arise in taking photographs with normal automatic exposures due to over- or under-exposures.

SUMMARY OF THE INVENTION

An object of this invention is to provide an exposure adjusting device for the automatic exposure camera wherein an operation member is automatically returned to the normal automatic exposure effecting position after taking a photograph with intentional exposure adjustment so as to eliminate any fault in the subsequent automatic exposure photographing operation due to an over- or under-exposure.

Another object of the present invention is to make it possible for the photographer to operate the exposure adjusting member while he is viewing the camera finder when taking a photograph with intentional over- or under-exposure so as to achieve improved operability.

Accordingly, the present invention provides an automatic exposure device comprising a striplike electric resistor and a brush in sliding contact therewith which are rotatable by film speed setting operation and diaphragm aperture adjusting operation to be shifted relative to each other so that the electric resistance determined by the change in the relative position of the resistor and brush serves as an element for determining automatic exposure, the device further comprising a film speed dial provided with a film speed scale and a positioning disc secured to the camera body or an upper cover thereof for positioning the dial at a position corresponding to the speed of film used, the positioning disc being provided with grooves adapted for engagement with a positioning pin extending from the film speed dial to determine the position thereof.

Further interposed between the film speed dial and the positioning disc is an exposure adjusting member receiving therein the dial in rotatable manner and movable in operative relation to the dial through a resilient member such as a spring whereby the film speed dial and the positioning disc can be engaged with and disengaged from each other by operating the adjusting member, the arrangement being such that when they are disengaged the film speed dial and the exposure adjusting member can be rotated to align a film speed graduation on the scale with a mark on the camera body or on the upper cover of the camera for film speed setting.

The exposure adjusting member is adapted to be so rotated as to rotate one of the brush and electric resistor integrally therewith, the other thereof being rotatable by a diaphragm aperture setting operation, the brush and resistor being thus shiftable relative to each other.

The exposure adjusting member is further rotatable by at least one division toward the direction of over- or under-exposure effecting position when the film speed dial is in engagement with the positioning disc, namely when the film speed dial is locked against rotation. Thus after the film speed dial is set in position and the diaphragm aperture for the take lens is set, namely when the camera is ready for a photographing operation, the relative position of the brush and electric resistor can be so varied as to effect an over- or under-exposure as desired.

In accordance with this invention, therefore, the automatic exposure camera can be intentionally adapted for an over- or under-exposure as desired for the compensation for backlight or for like purposes. It is possible for the photographer to effect such adjustment while he is viewing the finder, ready to take a photograph.

When the exposure adjusting member is freed from the operating force upon completion of a photographing operation, the member returns to the original state automatically under the action of the resilient member, permitting the brush and the electric resistor to shift relative to each other to the position determined by the film speed dial and the diaphragm aperture adjustment.

Further according to this invention, the film speed dial indicates a normal film speed during the intentional over- or under-exposure making operation.

DESCRIPTION OF THE PREFERRED EMBODIMENT

Figure 1:
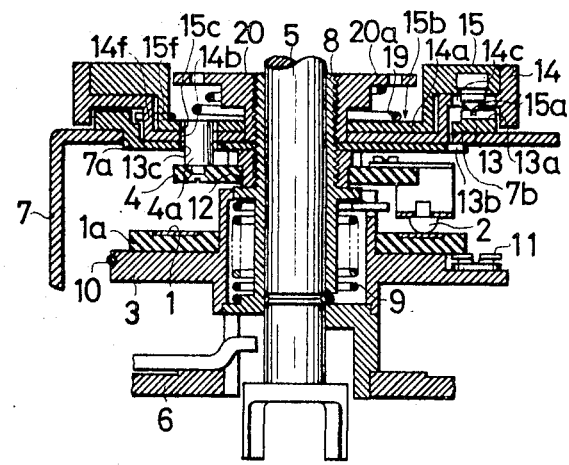
FIG. 1 is a view in vertical section showing the principal parts of an embodiment of this invention.
Figure 2:
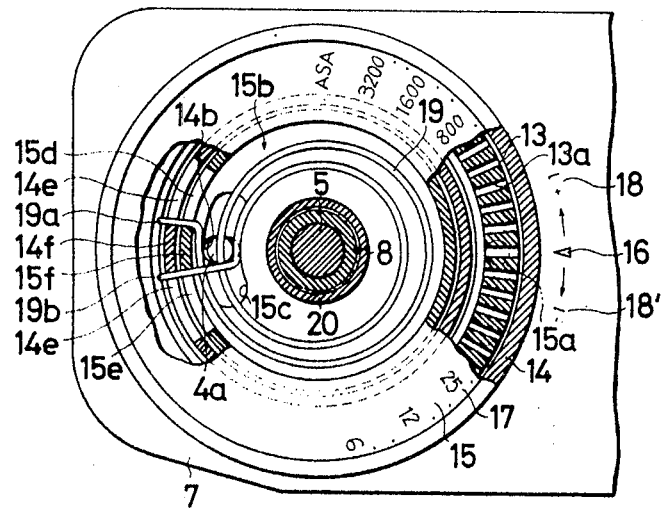
FIG. 2 is a plan view of FIG. 1 with part broken away.
Figure 3:
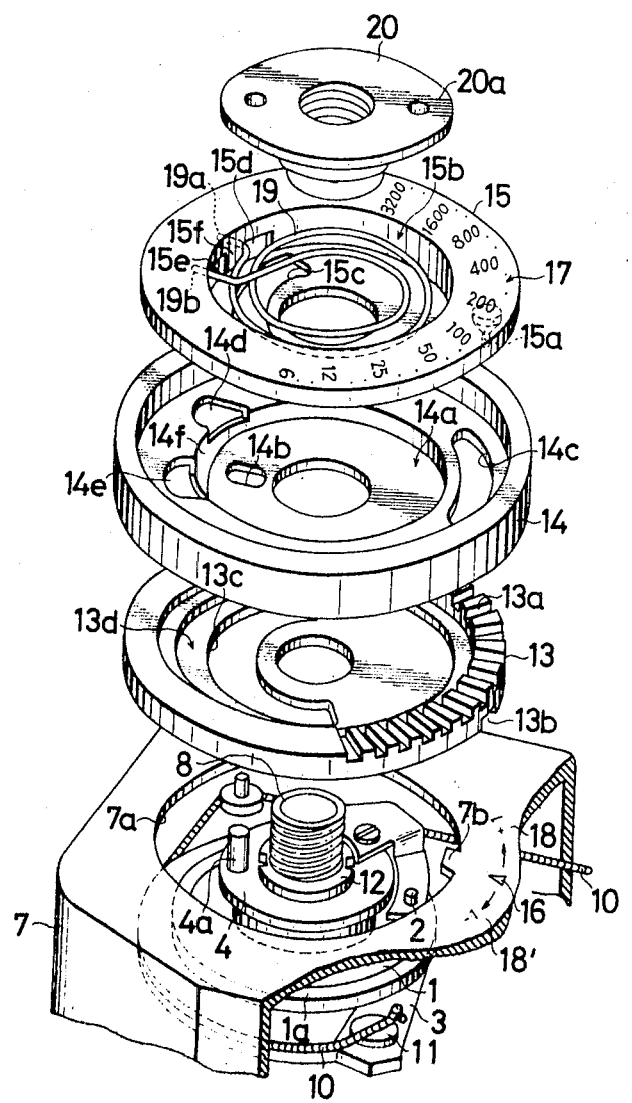
FIG. 3 is an exploded perspective view showing the embodiment.

Referring to FIG. 1, an electric resistor 1 in the shape of an arcuate strip is fixed to a base plate 1a which is secured onto a resistor support plate 3. A brush 2 in sliding contact with the resistor 1 is fixed to a brush support plate 4.

The support plates 3 and 4 are mounted on a post 8 rotatably supporting a film rewinding shaft 5 in its inner bore and having a lower end fixed to a camera body 6 and an upper end projecting upward from the upper face of upper cover 7 of the camera. One end of the resistor 1 and the brush 2 are electrically connected to terminals of a control electric circuit (not shown) of a known automatic exposure system, the arrangement being such that the shifting of the brush 2 in sliding contact with the resistor 1 enables the resistor 1 to act as a variable resistor for the electric circuit. The output of the resistor and the output of a photocell such as CdS for measuring the brightness of the subject serve to automatically determine the shutter speed. Thus, the resistor acts as an element for the determination of exposure.

The resistor support plate 3 is urged in a definite direction of rotation by a coil spring 9 and provided with a string 10 for connection, for example, to a diaphragm ring (not shown) of the take lens, with one end of the string 10 fixed to the plate by a pin 11. The support plate 3 is therefore rotatable by a diaphragm aperture setting operation through a rotational angle corresponding to a diaphragm aperture setting.

On the other hand, the brush support plate 4 is provided on its upper face with an upstanding interlocking pin 4a, through which the brush support plate 4 is rotated, for example, by a film speed setting operation a rotational angle corresponding to a film speed setting. A nut 12 is provided to mount the support plates 3 and 4 on the post 8.

The resistor 1 and brush 2 in sliding contact therewith are shifted relative to each other by diaphragm aperture setting operation and film speed setting operation so as to bring the resistance value into corresponding relation to the diaphragm aperture and film speed.

The automatic exposure system described above is of the type wherein the shutter speed is automatically controlled by the foregoing electric circuit. In the system wherein the shutter speed is preset and the diaphragm aperture value is automatically controlled, one of the resistor 1 or the brush 2 may of course be driven in operative relation to a shutter speed setting operation, with the other driven in operative relation to a film speed setting operation to change the positions thereof relative to each other.

The post 8 extends through an internal bore of a positioning disc 13 fixed to the upper cover 7 and projects upward from the cover 7, the projecting upper portion carrying an exposure adjusting member 14 and a film speed dial 15 in rotatable and vertically movable manner.

The positioning disc 13, exposure adjusting member 14 and film speed dial 15 are each formed in the shape of a dish and arranged in superposed relation. The positioning disc 13 is fixedly mounted on the upper cover 7 of the camera with its stepped portion fitted in an opening 7a formed in the top face of the cover 7. A projection 7b extending into the opening 7a engages in a notch 13b in the under face of the disc 13 to lock the disc. The disc 13 is further formed with a great number of positioning grooves 13a extending in radial directions and with an arcuate window 13c through which the interlocking pin 4a on the brush support plate 4 extends and which permits arcuate movement of the pin 4a. The opposite ends of the arcuate window 13c limit the arcuate movement of the pin 4a to thereby restrict the rotational angle of the brush support plate 4.

The exposure adjusting member 14 is in the form of a dial-type knob and receives the film speed dial 15 rotatably fitted in a recessed portion 14a in the upper face of the member 14. The lower projecting portion of the member 14 rotatably fits in a recessed portion 13d in the upper face of the positioning disc 13. The adjusting member 14 is further formed with a hole 14b for fitting engagement with the interlocking pin 4a projecting above the positioning disc 13 so that the adjusting member 14 and the brush 2 can be driven integrally.

The film speed dial 15 is provided on its upper face with a film speed scale 17 in opposing relation to a mark 16 on the upper cover 7. A positioning pin 15a extends from the under face of the dial 15, downward through an arcuate window 14c formed in the exposure adjusting member 14 and has a lower end engageable in the groove 13a of the positioning disc 13 so as to determine the position of the dial 15. The opposite ends of the arcuate window 14c are adapted for engagement with the pin 15a so as to limit the rotational angle of the exposure adjusting member 14 relative to the film speed dial 15.

Provided on the opposite sides of the mark 16 are indexes 18 and 18' indicating the amount of rotation of the exposure adjusting member 14 relative to the film speed dial 15 and serving for intentional exposure adjustment (to effect an over- or under-exposure.).

Disposed in a recessed portion 15b in the upper face of the film speed dial 15 is a spiral coil spring 19 serving as an elastic member and having bent portions 19a and 19b at its opposite ends which engage in holes 15d and 15e formed in the side face of the recessed portion 15b. The bent portions 19a and 19b further clamp a postlike portion 15f between the holes 15d and 15e, with their distal ends further engaging in holes 14d and 14e in the side wall of recessed portion of the exposure adjusting member 14 to clamp a postlike portion 14f between the holes 14d and 14e. Thus the spring 19 enables the exposure adjusting member 14 and film speed dial 15 to be driven in their rotational direction in operative relation. The film speed dial 15 is formed, in the bottom plate of its recessed portion, with an arcuate window 15c in which the upper end of the interlocking pin 4a on the brush support plate 4 engages, permitting arcuate movement of the interlocking pin 4a effected by an operation to be described later.

A nut 20 is screwed on the upper end of the post 8. The nut 20 is engaged in the recess 15b of the film speed dial 15, with the under face of flange 20a of the nut 20 in contact with the upper end of the coil spring 19. The lower end of the spring is in resilient contact with the bottom plate of the film speed dial 15, whereby the axial resilient force of the spring 19 acts on the film speed dial 15 to urge the exposure adjusting member 14 downward through the dial 15.

Diaphragm aperture adjustment by operating the diaphragm ring for the take lens causes the string 8 to rotate the resistor support plate 3, which in turn brings the striplike resistor 1 to a position corresponding to a diaphragm aperture setting.

On the other hand, if the exposure adjusting member 14 is pulled upward against the action of spring 19, the film speed dial 15 is also moved upward, whereby the positioning pin 15a is disengaged from the groove 13a of the positioning disc 13, leaving the dial 15 free to rotate. When the exposure adjusting member 14 is rotated in this state, the film speed dial 15 is also rotated integrally therewith through the spring 19. Accordingly, a graduation of the film speed scale 17 is aligned with the mark on the upper cover 7 for film speed setting. When the exposure adjusting member 14 rotates, the brush support plate 4 also rotates integrally therewith through the interlocking pin 4a, thereby bringing the brush 2 to a position corresponding to the film speed setting to determine the resistance value given by the resistor 1.

When the exposure adjusting member 14 is freed from the operating force, the member 14 and film speed dial 15 move down under the action of the spring 19, causing the positioning pin 15a to engage in the groove 13a of the positioning disc 13 to lock the film speed dial 15 against rotation. When a photograph is taken in this state, the exposure control electric circuit controls shutter speed with the foregoing resistance value and the amount of light received by CdS or the like in order to make a proper automatic exposure.

When making a greater or smaller amount of exposure than the normal exposure value for compensation of backlight on the subject or for the like purposes, film speed setting and diaphragm aperture setting procedures for a usual or normal state are followed and then immediately before taking a photograph, the exposure adjusting member 14 is rotated to the position indicated by the index 18 or 18', namely up to +1 for an over-exposure or toward −1 for an under-exposure. The shutter is then released while this state is maintained. Thus, by rotating the exposure adjusting member 14 to the above-mentioned position, the brush 2 is shifted from the initially set position to the over- or under-exposure position to vary the resistance value for making an over- or under-exposure.

In this way, the foregoing operation of the exposure, adjusting member 14 can be conducted while the photographer is viewing the finder of the camera.

When the exposure adjusting member 14 is freed from the operation force (i.e., rotational force), the member 14 returns to the normal exposure position under the action of the spring 19 to return the brush 2 to the position corresponding to the film speed setting. Thus, the exposure adjusting member 14 will not be retained in the over- or under-exposure position.

Although the illustrated embodiment shows the case wherein the exposure adjusting member 14 is rotatable by one division up to the over- and under-exposure positions respectively (i.e., by twice the normal exposure value and one-half thereof), the intentional exposure making operation can easily be effected stepwise over several divisions for over-exposures and under-exposures relative to the normal exposure by providing the indexes 18 and 18' in the form of a scale including several divisions.

If the pointer of exposure meter is positioned within the finder of the camera or its movement is indicated therein with shutter speed scale provided for the movement of the pointer, the photographer can recognize at which division the setting for intentional over- or under-exposure is made.

Althrough the brush is operatively connected to the exposure adjusting member and the resistor to the diaphragm ring in the above embodiment, this arrangement to establish the operative relation can be easily changeable. For instance, the brush can be operatively associated with the diaphragm ring and the resistor with the exposure adjusting member. This will be readily understood from the foregoing description. Such arrangement is also included within the scope of this invention.

What is claimed is:

1. In an automatic exposure camera, a device for selectively effecting over- and under-exposure comprising:

a rotatable means for setting the film speed;

a rotatable adjusting member for rotating said rotatable means for setting the film speed;

a rotatable film speed dial for indicating the film speed setting;

a locking means engageable with said film speed dial for releasably locking said film speed dial in preselected position; and a resilient member mechanically coupling said adjusting member with said film speed dial, said film speed dial being rotatable with said adjusting member through said resilient member when said film speed dial is released from said locking means; and said adjusting member being rotatable in opposition to the resilience of said resilient member when said film speed dial is in locked engagement with said locking means.

2. The automatic exposure device as set forth in claim 1, wherein said rotatable means for setting film speed comprises a variable resistor including a strip resistance element and a rotatable brush in sliding contact therewith, the resistance of said variable resistor electrically setting film speed.

3. The automatic exposure device as set forth in claim 1, wherein said adjusting member and said film speed dial are concentrically arranged, each having an eccentric post member; and said resilient member includes a spring having opposing legs which sandwich both said post members permitting said adjusting member to rotate in opposite directions against the resilient force of said spring when said film speed dial is in locked engagement with said locking means.

4. The automatic exposure device as set forth in claim 1, wherein said adjusting member is spatially interposed between said film speed dial and said positioning means, and has formed therein an arcuate window, and including through a pin projecting from said film speed dial through said window into releasable engagement with said locking means, whereby the range of rotation of said adjusting member relative to said dial is limited to the longitudinal dimension of said window.

5. The automatic exposure device as set forth in claim 1, wherein said resilient member normally urges said film speed dial into engagement with said positioning means.

6. The automatic exposure device as set forth in claim 1, wherein said film speed dial and said adjusting member are concentrically mounted on the film rewinding knob shaft of the camera.

* * * * *

UNITED STATES PATENT OFFICE
CERTIFICATE OF CORRECTION

Patent No. 3,742,824     Dated July 3, 1973

Inventor(s) HIROSHI UEDA ET AL.

It is certified that error appears in the above-identified patent and that said Letters Patent are hereby corrected as shown below:

-- 30  Foreign Application Priority Data

Japan     April 1, 1971.................46-24261 --

Signed and sealed this 1st day of January 1974.

(SEAL)
Attest:

EDWARD M. FLETCHER, JR.          RENE D. TEGTMEYER
Attesting Officer                Acting Commissioner of Patents